(12) United States Patent
Alefelder et al.

(10) Patent No.: US 9,923,352 B2
(45) Date of Patent: Mar. 20, 2018

(54) DEVICE FOR CONNECTING A FIRST BUS BAR TO A SECOND BUS BAR

(71) Applicant: Siemens Aktiengesellschaft, München (DE)

(72) Inventors: Frank Alefelder, Neunkirchen-Seelscheid (DE); Rainer Haar, Bonn (DE); Dirk Rottlaender, Cologne (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 10 days.

(21) Appl. No.: 14/915,984

(22) PCT Filed: Sep. 3, 2014

(86) PCT No.: PCT/EP2014/068732
§ 371 (c)(1),
(2) Date: Mar. 2, 2016

(87) PCT Pub. No.: WO2015/036303
PCT Pub. Date: Mar. 19, 2015

(65) Prior Publication Data
US 2016/0197463 A1 Jul. 7, 2016

(30) Foreign Application Priority Data
Sep. 16, 2013 (DE) .................. 10 2013 218 508

(51) Int. Cl.
*H02G 5/06* (2006.01)
*H02G 5/00* (2006.01)

(52) U.S. Cl.
CPC .................. *H02G 5/007* (2013.01)

(58) Field of Classification Search
CPC . H02G 5/007; H02G 5/00; H01R 4/40; H01R 12/714; H01R 12/79; H01R 13/631; H01R 4/58; F21V 21/35
See application file for complete search history.

(56) References Cited

U.S. PATENT DOCUMENTS

| 2,719,203 A | * | 9/1955 | Dobrosielski | .......... H01H 73/18 |
| | | | | 200/275 |
| 3,339,038 A | * | 8/1967 | Jorgensen | ................ H02G 5/08 |
| | | | | 200/50.2 |

(Continued)

FOREIGN PATENT DOCUMENTS

| CN | 102217156 A | 10/2011 |
| DE | 1010604 B | 6/1957 |

(Continued)

OTHER PUBLICATIONS

Chinese Office Action dated Dec. 20, 2016.
(Continued)

*Primary Examiner* — William H Mayo, III
*Assistant Examiner* — Rhadames J. Alonzo Miller
(74) *Attorney, Agent, or Firm* — Harness, Dickey & Peirce, P.L.C.

(57) ABSTRACT

A device is disclosed for connecting a first bus bar to a second bus bar. The device includes a pivoting device and an adapter bus bar. The pivoting device is connected to the adapter bus bar and is mounted to pivot about the adapter bus bar. The pivoting device can be fastened to a first busbar or to a housing of a first busbar, and the adapter busbar can be pivoted into a second position in which it can be electrically connected to a second busbar.

18 Claims, 3 Drawing Sheets

(56) References Cited

U.S. PATENT DOCUMENTS

| | | | | |
|---|---|---|---|---|
| 3,820,057 | A * | 6/1974 | Joly | H02G 5/007 |
| | | | | 174/88 B |
| 4,468,547 | A * | 8/1984 | Belttary | H01H 71/08 |
| | | | | 200/294 |
| 4,912,599 | A * | 3/1990 | Wittmer | H02G 5/08 |
| | | | | 200/50.2 |
| 5,024,627 | A * | 6/1991 | Bennett | H01R 12/721 |
| | | | | 439/247 |
| 5,030,108 | A * | 7/1991 | Babow | C07C 45/70 |
| | | | | 174/72 B |
| 6,296,498 | B1 * | 10/2001 | Ross | H01R 25/145 |
| | | | | 439/115 |
| 2007/0279166 | A1 * | 12/2007 | VanderVeen | H01H 71/08 |
| | | | | 335/202 |
| 2011/0221205 | A1 | 9/2011 | Haar et al. | |
| 2012/0094553 | A1 * | 4/2012 | Fujiwara | H01R 24/58 |
| | | | | 439/891 |
| 2012/0314340 | A1 * | 12/2012 | Faber | H01R 13/04 |
| | | | | 361/611 |

FOREIGN PATENT DOCUMENTS

| | | |
|---|---|---|
| DE | 1096997 B | 1/1961 |
| DE | 10 2010 045 946 A1 | 3/2012 |
| DE | 102011085517 A1 | 5/2013 |
| FR | 1472630 A | 3/1967 |
| WO | WO-2011067647 A2 | 6/2011 |

OTHER PUBLICATIONS

International Search Report PCT/ISA/210 for International Application No. PCT/EP2014/068732 dated Nov. 11, 2014.

Written Opinion of the International Searching Authority PCT/ISA/237 for International Application No. PCT/EP2014/068732 dated Nov. 11, 2014.

German Office Action dated Jul. 1, 2014.

* cited by examiner

DEVICE FOR CONNECTING A FIRST BUS BAR TO A SECOND BUS BAR

PRIORITY STATEMENT

This application is the national phase under 35 U.S.C. §371 of PCT International Application No. PCT/EP2014/068732 which has an International filing date of Sep. 3, 2014, which designated the United States of America and which claims priority to German patent application number 102013218508.1 filed Sep. 16, 2013, the entire contents of which are hereby incorporated herein by reference.

FIELD

An embodiment of the present invention generally relates to a device for connecting a first busbar to a second busbar, and to a segment connector for a busbar system, and to a busbar system.

BACKGROUND

Electrical distribution systems can be in the form of busbar systems. In the busbar systems, the busbars are in the form of elongate, fixed conductors in the direction of current flow. The busbars are used to transport or to distribute electrical energy. Typical tasks of a busbar system include, for example, connecting a transformer, by way of a main distribution board, to the sub-distribution board, or supplying electrical energy to large consumers. Busbar systems are likewise used, by way of example, in wind energy installations to conduct the power of a generator, which power is generated in the head of the tower, to the foot of the tower or to transport power from the foot of the tower into the head of the tower in order to supply energy to electrical installations there.

Towers of wind energy installations are erected by way of individual tower segments which are combined to form a single wind energy installation tower at the respective intended location. The busbars are typically pre-installed into the respective segments in each case and are then connected by way of a segment connector to form a common busbar line after connection of the tower segments.

In order to not damage the busbars during erection of the tower, the lowermost rail of the segment which is to be installed is typically held at a distance by the manufacturer of the wind energy installation by way of Styropor panels on one side such that the segments can be erected without accidents. In addition, the lowermost busbar is fixed to a steel support system by way of securing straps, so that it is not possible for the busbar or the components to undesirably become detached and fall down. After the tower segments have been connected and the Styropor panels and securing straps have been removed, it is possible to electrically connect the busbars to one another. Assembly tolerances of the wind energy installation tower are compensated for by way of compensation for expansion of the busbars.

Conventional assembly, as described above, means an unsafe procedure which is time-consuming. Furthermore, the previous procedure also entails the potential risk of breach of product safety. Owing to the oblique positioning of the busbars, there is a risk of the clamping connection being subjected to undefined loading and the insulating panels possibly being damaged as a result. In the worst case scenario, the insulating panels are so severely damaged that there is an inadequate insulation distance between the voltage-carrying conductors and there is a risk of a short circuit. Similarly, product safety can be put at risk by the lack of compensation of the assembly tolerances in the conventional procedure.

SUMMARY

At least one embodiment of the invention provides a device for connecting a first busbar to a second busbar, which device overcomes the disadvantages of the previous connections.

At least one embodiment of the invention is directed to a device for connecting a first busbar to a second busbar comprising a pivoting device and an adapter busbar, wherein the pivoting device is connected to the adapter busbar and is mounted such that it can pivot about the adapter busbar. As a result, it is possible to pivot the adapter busbar between the first busbar and the second busbar in the mounted position by way of the pivoting device. In this case, it is advantageous for the pivoting device to produce an orientation which prevents, for example, oblique positioning of the busbars, as a result of which damage is avoided.

At least one embodiment of the invention is directed to a segment connector comprising a first busbar and a device according to at least one embodiment for connecting a first busbar to a second busbar, wherein the adapter busbar can be pivoted in against the first busbar and can be electrically connected to the first busbar.

At least one embodiment of the invention is directed to a busbar system comprising a second busbar and a segment connector according to at least one embodiment of the invention, wherein the adapter busbar can be pivoted in between the first busbar and the second busbar and can be electrically connected to the first busbar and second busbar.

BRIEF DESCRIPTION OF THE DRAWINGS

The above-described properties, features and advantages of this invention and the manner in which they are achieved become clearer and more easily understandable in connection with the following description of the example embodiments which are explained in greater detail in connection with the figures, in which.

DETAILED DESCRIPTION OF THE EXAMPLE EMBODIMENTS

At least one embodiment of the invention is directed to a device for connecting a first busbar to a second busbar comprising a pivoting device and an adapter busbar, wherein the pivoting device is connected to the adapter busbar and is mounted such that it can pivot about the adapter busbar. As a result, it is possible to pivot the adapter busbar between the first busbar and the second busbar in the mounted position by way of the pivoting device. In this case, it is advantageous for the pivoting device to produce an orientation which prevents, for example, oblique positioning of the busbars, as a result of which damage is avoided.

In a refinement of at least one embodiment of the invention, the pivoting device can be fastened to a first busbar or to a housing of a first busbar, and the adapter busbar can be pivoted into a first position in which it can be electrically connected to the first busbar.

In a further refinement of at least one embodiment, the pivoting device can be fastened to a first busbar or to a housing of a first busbar, and the adapter busbar can be pivoted into a second position in which it can be electrically connected to a second busbar.

In a further refinement of at least one embodiment of the invention, the first end of the adapter busbar is provided with a displaceable single-bolt clamping connection. The second end of the adapter busbar can be of hook-like design for electrical connection by way of a single-bolt clamping connection.

In a refinement of at least one embodiment of the invention, the pivoting device comprises an elongate hole. The elongate hole can be positioned in the pivoting device such that the displaceable single-bolt clamping connection can be operated through the elongate hole in the first position of the adapter busbar.

In a refinement of at least one embodiment of the invention, the pivoting device is a metal sheet or a flexible element.

At least one embodiment of the invention is directed to a segment connector comprising a first busbar and a device according to at least one embodiment for connecting a first busbar to a second busbar, wherein the adapter busbar can be pivoted in against the first busbar and can be electrically connected to the first busbar.

The first busbar and the adapter busbar can each be surrounded by a busbar housing.

In a further refinement, the pivoting device is fastened to the first busbar or to the housing of the first busbar, and the adapter busbar can be pivoted into a first position in which it can be electrically connected to the first busbar.

In a further refinement of the invention, the pivoting device can be moved along the first busbar or along the housing of the first busbar in a guide. The guide can comprise a locking position for securing the adapter busbar during transportation or during assembly, it being possible for the device to be pivoted from the locking position into the first position.

Figure 1:
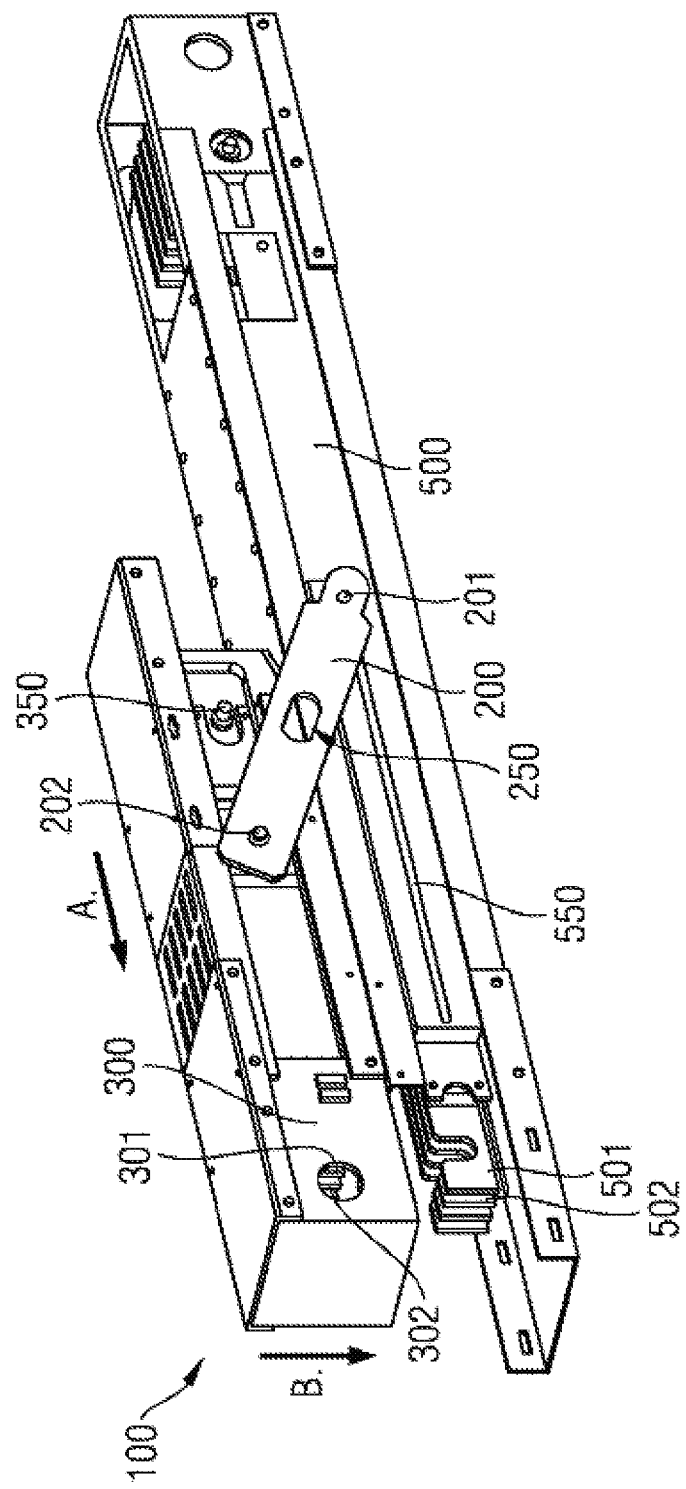
FIG. 1 shows a segment connector for a busbar system including a first busbar, a pivoting device and an adapter busbar.

FIG. 1 shows a device 100 for connecting a first busbar 501; 502 to a second busbar. To this end, the device comprises a pivoting device 200 and an adapter busbar 301; 302, wherein the pivoting device 200 is connected to the adapter busbar 301; 302 and is mounted such that it can pivot about the adapter busbar 301; 302. In the example embodiment according to FIG. 1, the pivoting device 200 is designed as a metal sheet. It is likewise possible for the pivoting device 200 to comprise a flexible element which is manufactured, for example, from plastic.

The pivoting device 200 is fastened to a housing 500 of the first busbar 501; 502. The pivoting device 200 is fastened to the housing 500 of the first busbar 501; 502 by way of the bearing 201 and can be rotated about the bearing 201. The further bearing 202 of the pivoting device 200 is fastened to the housing 300 of the adapter busbar 301; 302, so that the adapter busbar 301, 302 is fastened such that it can rotate about the bearing 202.

According to the example embodiment in FIG. 1, the adapter busbar 301; 302 can comprise a plurality of busbars. The plurality of busbars typically run parallel to one another and serve, for example, to transport current to the individual phases. Two busbars, the adapter busbar 301 and the adapter busbar 302, are shown in FIG. 1.

The first end of the adapter busbar 301; 302 is connected to a displaceable single-bolt clamping connection 350. This allows assembly tolerances to be compensated by the single-bolt clamping connection 350 being displaceable, for example, by ±3 cm and therefore being able to compensate longitudinal distances in this region. The second end of the adapter busbar 301; 302 is of hook-like design for electrical connection by way of a single-bolt clamping connection of a second busbar.

Figure 2:
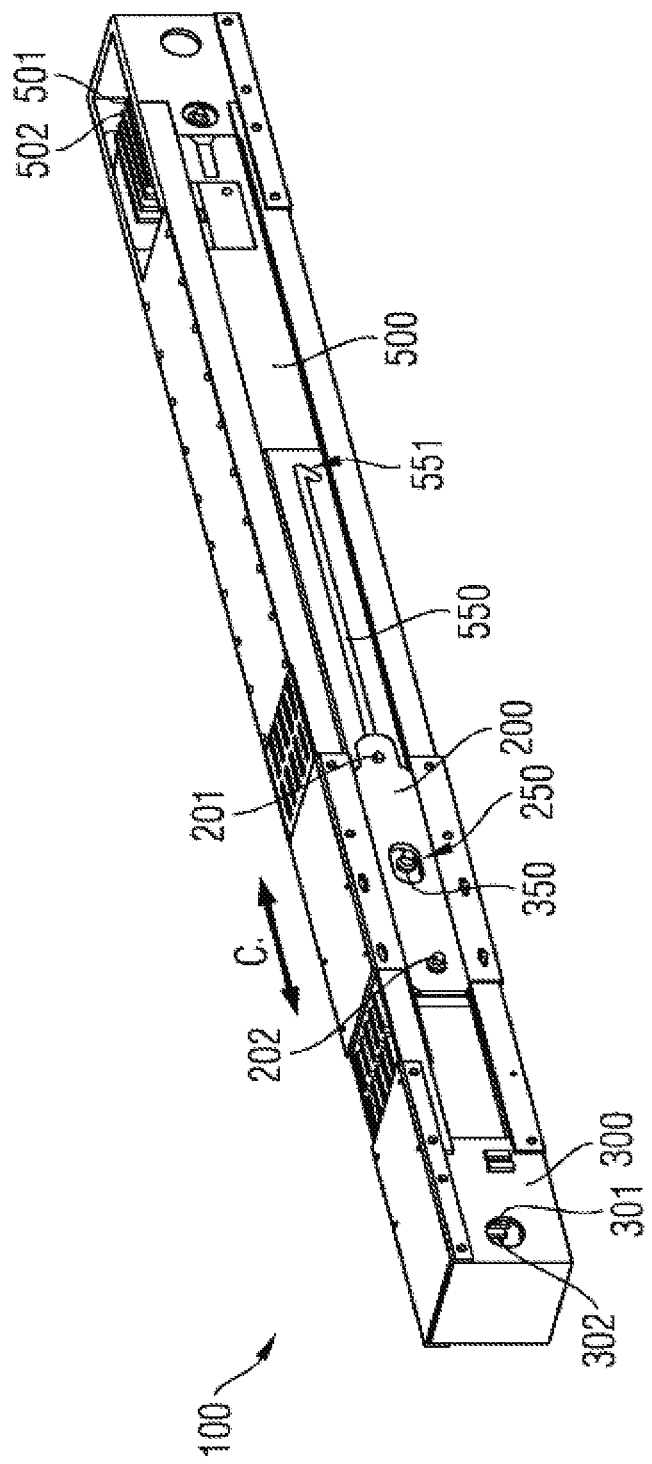
FIG. 2 shows a segment connector in a first position in which the adapter busbar can be electrically connected to the first busbar.

FIG. 2 shows the device 100 in a first position in which the adapter busbar 301; 302 can be electrically connected to the first busbar 501; 502. In order to pivot the adapter busbar 301; 302, a guide 550 is fitted to the housing 500 of the first busbar 501; 502. The bearing 201 can be moved along the guide 550, so that, in accordance with FIGS. 1 and 2, the adapter busbar 301; 302 can be moved in arrow direction A. As soon as the end of the guide 550 is reached, the adapter busbar 301; 302 can be pivoted in arrow direction B and brought level with the first busbar 501; 502. The displaceable single-bolt clamping connection 350 of the adapter busbar 301; 302 can perform tolerance compensation in this position. That is to say, the single-bolt clamping connection 350 can be moved along arrow direction C.

The pivoting device 200 comprises an elongate hole 250. In the first position of the adapter busbar 301; 302, as shown in FIG. 2, the displaceable single-bolt clamping connection 350 can be operated through the elongate hole 250. This means, firstly, that the displaceable single-bolt clamping connection 350 can be tightened or released through the elongate hole 250, but secondly also that the displaceable single-bolt clamping connection 350 can be moved along arrow direction C for tolerance compensation.

The guide 550 can comprise a locking position 551 for transportation or assembly purposes. FIG. 1 shows the adapter busbar 301; 302 in this locking position 551. It is advantageous for the adapter busbar 301; 302 to be in the locking position 551 when the device 100 is installed vertically for example. After installation of the first busbar 501; 502, the adapter busbar 301; 302 can leave the locking position 551, and the device 100 can be pivoted into the first position in which the adapter busbar 301; 302 can be electrically connected to the first busbar 501; 502.

Figure 3:
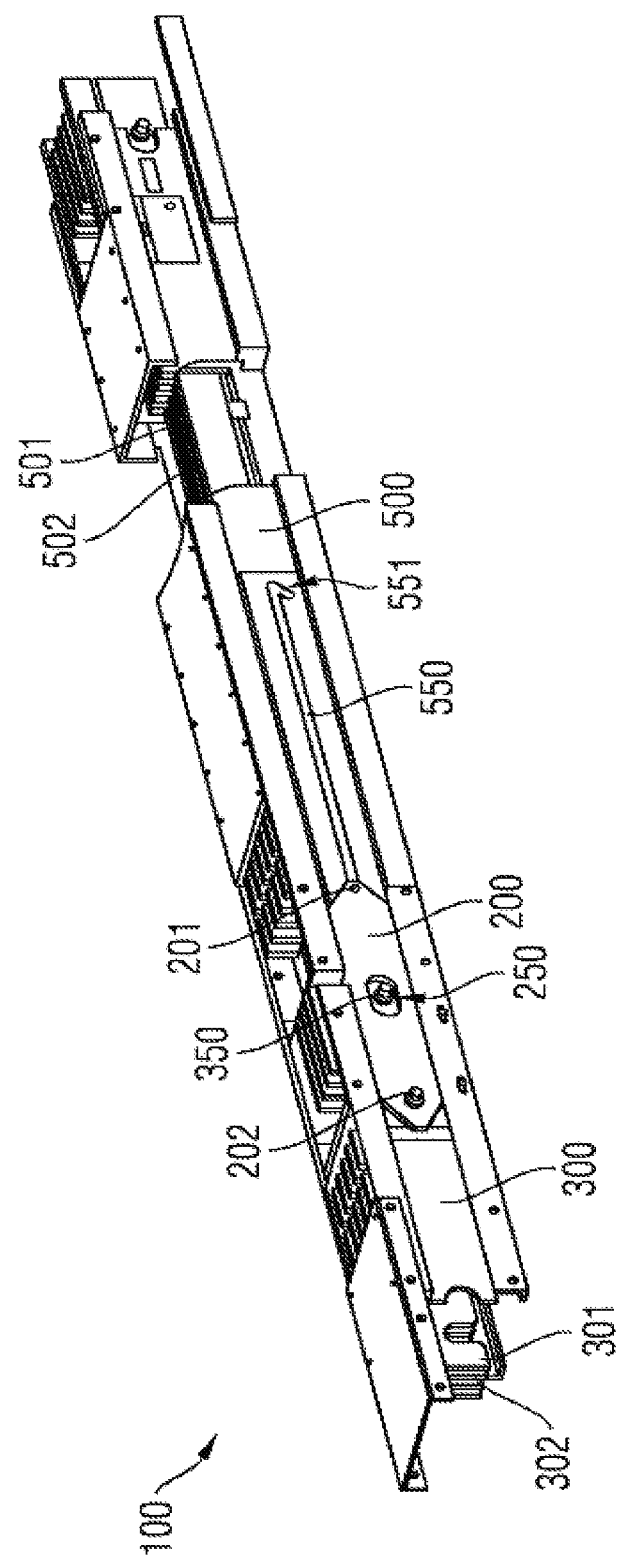
FIG. 3 shows a segment connector in a first position in which the adapter busbar can be electrically connected to the first busbar.

FIG. 3 shows the device 100 for connecting a first busbar 501; 502 to a second busbar. The first busbar 501; 502 is surrounded by a busbar housing 500; the adapter busbar 301; 302 is surrounded by a busbar housing 300.

The device 100 is in the first position in which the first busbar 501; 502 can be electrically connected to the adapter busbar 301; 302. According to FIG. 3, a second busbar can be electrically connected to the device 100 and the first busbar 501; 502 at the left-hand end of the adapter busbars 301; 302, the left-hand end being of hook-like design. The adapter busbar 301; 302 is now in a second position in which it can be electrically connected to a second busbar. Therefore, the first position and the second position are identical in this example embodiment.

The device 100 comprising the pivoting device 200 and the adapter busbar 301; 302 can be used together with the first busbar 501; 502 as a so-called segment connector. The segment connector can be used to electrically connect different segments, for example in a wind energy installation, to one another. The segment connector can be part of a busbar system, for example a busbar system of a wind energy installation.

The segment connector according to the invention is realized as a type of tandem length. The tandem length can be projected into the tower of a wind energy installation such that the ends of the first busbar 501; 502 are recessed by, for example, approximately 300 mm and are protected against damage by the protruding steel structure of the housing 500.

In its locking position 551, the adapter busbar 301; 302 rests on the first busbar 501; 502 according to the illustration in FIG. 1. The adapter busbar 301; 302 can be displaced within a firmly defined range which is realized by the pivoting device 200. In order to realize the required assembly tolerance compensation, the adapter busbar 301; 302 is provided with a displaceable single-bolt clamping connection 350.

The device 100 according to the invention and the segment connector comprising the device 100 and the first busbar 501; 502 can be fully pre-installed in a wind energy installation in the segment of a tower. After the tower segments are combined, it is only necessary to remove the transportation securing device of the adapter busbar 301; 302 and to pivot the adapter busbar 301; 302 into the respective first positions for the purpose of connection to the first busbar 501; 502.

In this case, it is advantageous for rapid installation of the tower segments of a wind energy installation to be possible. The busbars, which serve to connect the segments, are always located in the correct installation location and do not have to be logistically coordinated. The segment connector in the locking position 551 realizes a distance between the busbar and the edge of the tower segment. This prevents the busbars from being damaged during erection of the wind energy installation. The device 100 and the segment connector comprising the device 100 of the first busbar 501; 502 can be operated by a single fitter, this being highly advantageous in the case of installation into the tower of a wind energy installation on account of the tight space conditions which prevail there.

The invention claimed is:

1. A device for connecting busbars, the device comprising:
   a first busbar, having a first housing;
   a second busbar;
   an adapter busbar, having a second housing;
   a pivoting device, which is fastened to the first housing of the first busbar by a first bearing and rotatable about said first bearing and which is fastened to the second housing of the adapter busbar and rotatable about a second bearing;
   a guide fitted to the first housing of the first busbar, wherein the first bearing is moveable along said guide, so that the adapter busbar is moveable in a first direction to an end of the guide, wherein reaching said end the adapter busbar is pivotable in a second direction to be brought level with the first busbar, in which the adapter busbar is electrically connected to the first busbar;
   the pivoting device is fastened to the first busbar or to the housing of the first busbar; and
   wherein the adapter busbar is pivotable into a second position, to electrically connect to the second busbar.

2. The device of claim 1, wherein the guide includes a locking position in which the adapter busbar rests on the first busbar.

3. The device of claim 1, wherein a first end of the adapter busbar is provided with a displaceable single-bolt clamping connection.

4. The device of claim 3, wherein a second end of the adapter busbar is of hook-like design for electrical connection by way of a single-bolt clamping connection.

5. The device of claim 4, wherein an elongate hole is included in the pivoting device.

6. The device of claim 5, wherein the elongate hole is positioned in the pivoting device such that the displaceable single-bolt clamping connection is operatable through the elongate hole in a first position of the adapter busbar.

7. The device of claim 1, wherein the pivoting device is a metal sheet or a flexible element.

8. A segment connector for a busbar system, comprising:
   the device of claim 1, wherein the adapter busbar is pivotable in against the first busbar and is electrically connectable to the first busbar.

9. The segment connector of claim 8, wherein the first busbar and the adapter busbar are each surrounded by a housing.

10. The segment connector of claim 9, wherein the pivoting device is fastened to the first busbar or to the housing of the first busbar, and the adapter busbar is pivotable into a first position, to be electrically connected to the first busbar.

11. The segment connector of claim 10, wherein the pivoting device is movable along the first busbar or along the housing of the first busbar in the guide.

12. The segment connector of claim 11, wherein the guide comprises a locking position for securing the adapter busbar during transportation or during assembly, the device being pivotable from the locking position into the first position.

13. A busbar system, comprising:
   the segment connector of claim 8, wherein the adapter busbar is pivotable in between the first busbar and the second busbar and is electrically connectable to the first busbar and second busbar.

14. The device of claim 1, wherein an elongate hole is included in the pivoting device.

15. The device of claim 14, wherein the elongate hole is positioned in the pivoting device such that a displaceable single-bolt clamping connection is operatable through the elongate hole in a first position of the adapter busbar.

16. The device of claim 2, wherein a second end of the adapter busbar is of hook-like design for electrical connection by way of a single-bolt clamping connection.

17. The device of claim 15, wherein an elongate hole is included in the pivoting device.

18. The device of claim 17, wherein the elongate hole is positioned in the pivoting device such that the displaceable single-bolt clamping connection is operatable through the elongate hole in the first position of the adapter busbar.

* * * * *